US009809257B2

(12) United States Patent
Gottfried

(10) Patent No.: US 9,809,257 B2
(45) Date of Patent: Nov. 7, 2017

(54) VEHICLE DIRT PROTECTION DEVICE AND METHOD

(71) Applicant: Ofer Gottfried, Tzur Moshe (IL)

(72) Inventor: Ofer Gottfried, Tzur Moshe (IL)

(*) Notice: Subject to any disclaimer, the term of this patent is extended or adjusted under 35 U.S.C. 154(b) by 0 days.

(21) Appl. No.: 15/296,153

(22) Filed: Oct. 18, 2016

(65) Prior Publication Data

US 2017/0120958 A1    May 4, 2017

Related U.S. Application Data

(60) Provisional application No. 62/249,376, filed on Nov. 2, 2015.

(51) Int. Cl.
*B60R 3/00*    (2006.01)
*B60R 3/02*    (2006.01)
*B62D 25/16*   (2006.01)
*B62D 35/00*   (2006.01)

(52) U.S. Cl.
CPC ............ *B62D 25/168* (2013.01); *B60R 3/002* (2013.01); *B62D 35/008* (2013.01)

(58) Field of Classification Search
CPC .............. B60R 3/00; B60R 3/02; B60R 3/002
See application file for complete search history.

(56) References Cited

U.S. PATENT DOCUMENTS

| | | | | | |
|---|---|---|---|---|---|
| 2,018,064 | A | * | 10/1935 | Hofacker | ................ B60R 3/002 280/166 |
| 2,214,048 | A | * | 9/1940 | Edwards | .............. H01Q 1/3291 280/164.1 |

* cited by examiner

*Primary Examiner* — Bryan Evans
(74) *Attorney, Agent, or Firm* — The Law Office of Michael E. Kondoudis

(57) ABSTRACT

A vehicle dirt protection device having a longitudinal extension extending larger than its lateral extension, and is placed along a lateral side of a vehicle for urging dirt, preferably dust, to extend horizontally and/or rearward during forward movement of the vehicle rather than upwards. This protects the seating area of the vehicle against dirt, and in particular against dirt.

18 Claims, 6 Drawing Sheets

VEHICLE DIRT PROTECTION DEVICE AND METHOD

TECHNICAL FIELD

Embodiments of the invention relate to a vehicle dirt protection device and method, in particular for protecting a seating area in the vehicle against dirt, in particular against dust.

BACKGROUND

A seating area in a vehicle, such as the vehicle's cockpit where a driver and/or passenger seats, may be exposed to incoming dirt such as dust. This may occur for example due to dust that is lifted when driving in off road terrain and/or in the outdoors. In dedicated off road vehicles, such as All-Terrain Vehicles (ATV's), side-by-side or Utility Task or Terrain Vehicle (UTV's); exposure to dirt may be increased since the driver is typically seated in a cockpit that is relatively open to the vehicle's outer environment.

Improvements in automotive engineering may reduce or control the amount and direction of for example dust kicked up by vehicles. One example for dust protection, provided by Aegis Air Spoilers of Idaho USA, includes mounting a spoiler at a rear side of a vehicle in order to create vacuum that pushes air out of the vehicle.

SUMMARY

The following embodiments and aspects thereof are described and illustrated in conjunction with systems, tools and methods which are meant to be exemplary and illustrative, not limiting in scope.

In a broad aspect, at least come embodiments of the present invention may be defined as relating to special dirt, preferably dust, protection devices; preferably in the form of side wings and/or spoilers—that may hook and/or attach and/or be fitted to a side of a vehicle (e.g. ATV/UTV) for tunneling and/or urging dirt dust and/or swirl lifted from a front wheel area of the vehicle, preferably away from the vehicle's cockpit.

In an embodiment of the invention, the dirt protection device may be curved and shaped to hold all or most dust from the front wheel and/or the bottom of the vehicle (e.g. UTV) away from entering the driver or passenger area.

Possibly, embodiments of the dirt protection devices may have dedicated hooks to connect to a side of the vehicle and/or existing built screw holes e.g. in the vehicle, device or both; and/or may require new holes/bores to be formed in e.g. the vehicle, device or both for attachment.

Possibly, the dirt protection device may be hooked or attached to the vehicle by temporary quick discharge connectors at the side of the vehicle and may be foldable, e.g. downwards or upwards, in order to allow the vehicle to assume substantially a similar lateral width as it would have without the dust protection device(s).

In an aspect of the invention, embodiments of the dirt protection device may be passive, i.e. able to provide e.g. dust tunneling/urging by virtue of shape alone combined with movement, preferably forward movement, of the vehicle.

In another aspect, embodiments of the protection device may be active or at least in part active, i.e. by including (for example in addition to passive shape tunneling) also means such as small reversed fan(s) possibly attached to a rear end of the device—for urging and/or assisting in sucking/tunneling e.g. dust and swirl along the wing and away from the vehicle In certain embodiments the protection device may be hooked permanently to the vehicle or temporarily with e.g. vacuum holders for quick removal if needed. Possibly, embodiments of the protection device may optionally be combined with a fender cover (preferably forward, optionally rear, or both) in order to protect from water/mud/dirt splashes and swirl from the front or back wheels.

Preferably, combination of the protection device with a fender may be with the front fender. Further, such combination with front and/or rear fender may be by integrally forming an embodiment of the a protection device with a fender, or by attaching by any means an embodiment of a protection device formed as a separate part with a fender of a vehicle.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

Figure 1A:
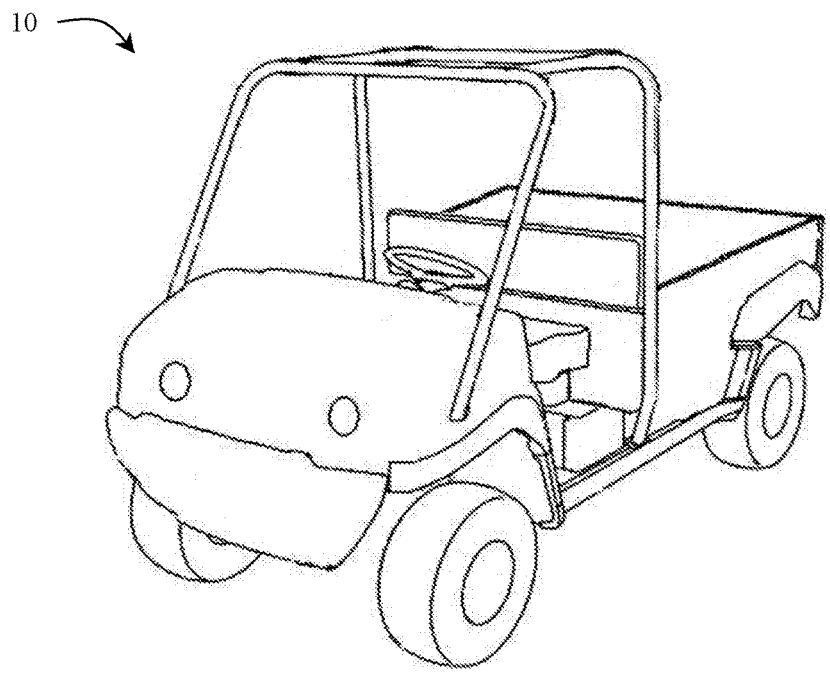
FIGS. 1A and 1B schematically show perspective views of a vehicle, respectively, when standing still and during forward movement when dirt, here dust, is lifted.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Figure 1B:
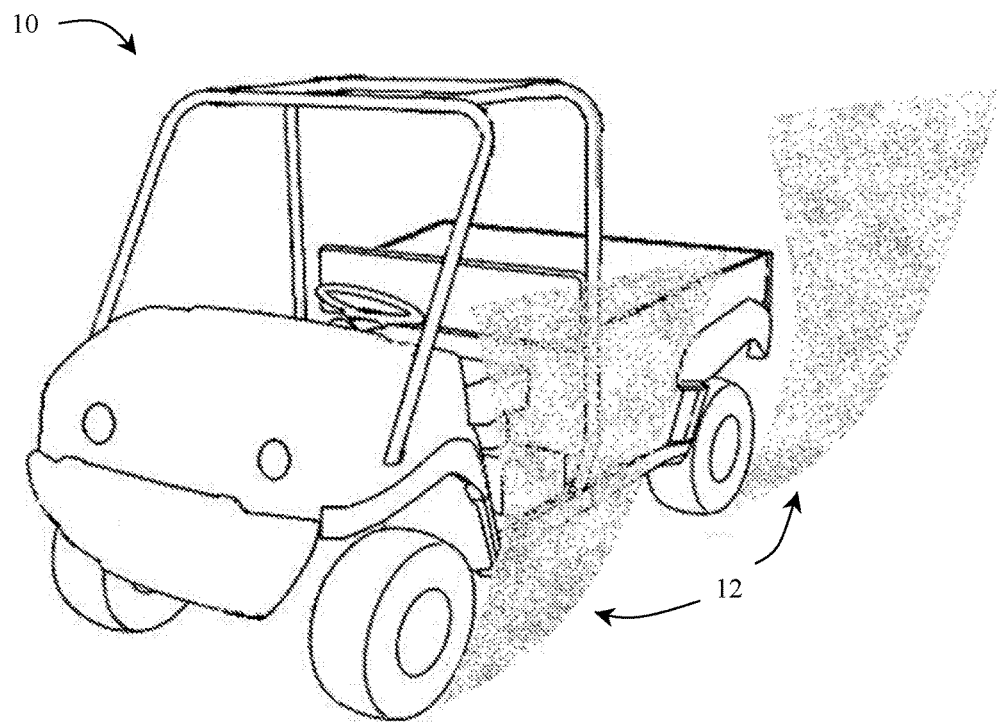

Attention is first drawn to FIGS. 1A and 1B showing a vehicle 10, preferably an outdoor or off-road vehicle such as an All-Terrain Vehicle (ATV), a side-by-side or Utility Task or Terrain Vehicle (UTV), or the like. In FIG. 1A the vehicle 10 is shown standing still and in FIG. 1B during forward movement when lifting or kicking up dirt, here dust (or possibly mud) 12 from the ground. The dirt lifted from the ground as shown may rise and enter the vehicle's cockpit and hinder with a driver or passenger's vision and/or comfort.

Figure 2A:
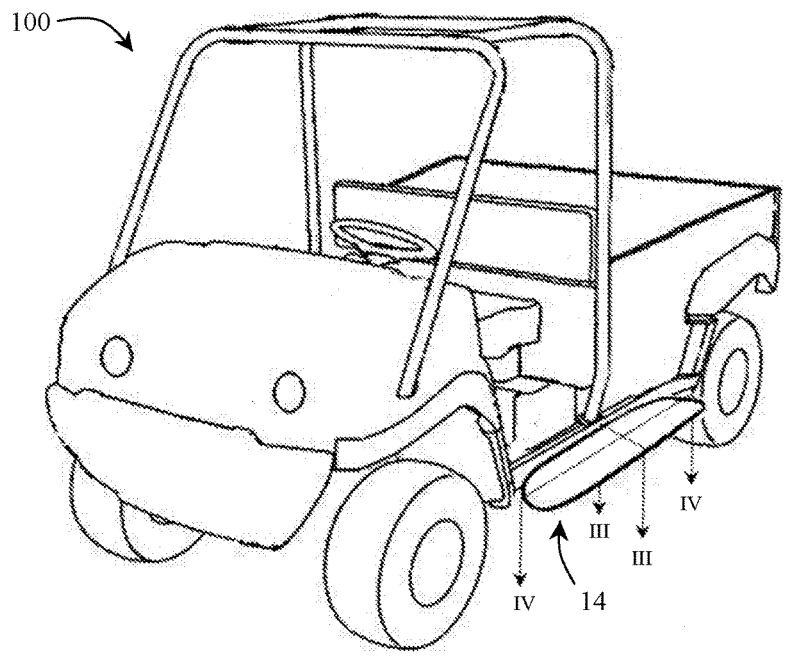
FIGS. 2A and 2B schematically show perspective views of a similar vehicle as in FIG. 1 with an embodiment of a dirt protection device of the present invention, respectively, when standing still and during forward movement when dirt, here dust, is lifted.
Figure 2B:
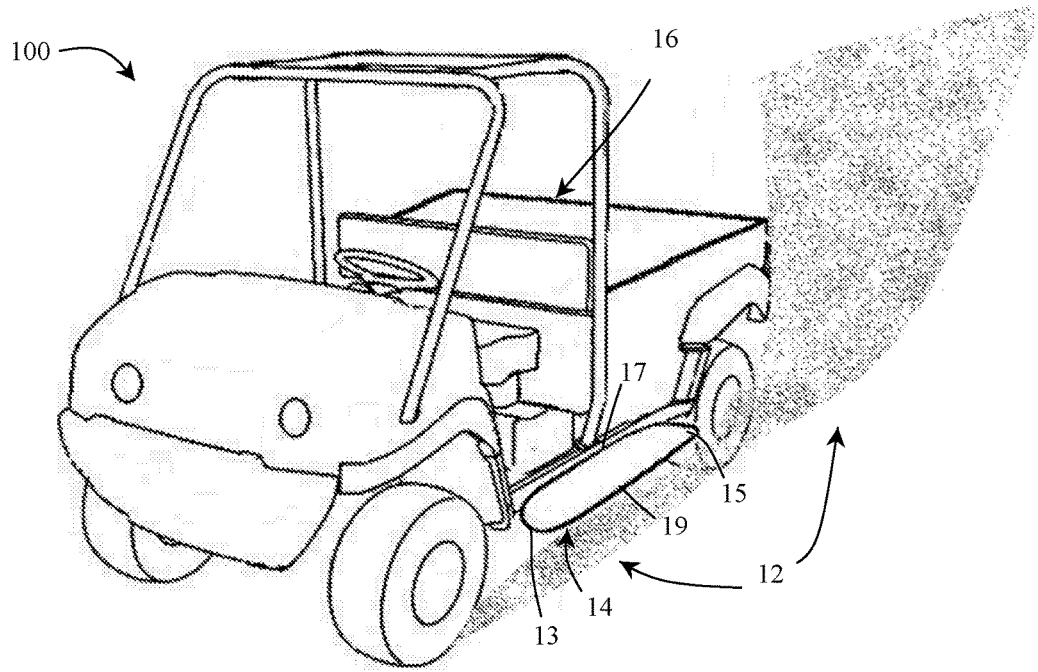
Figure 6:
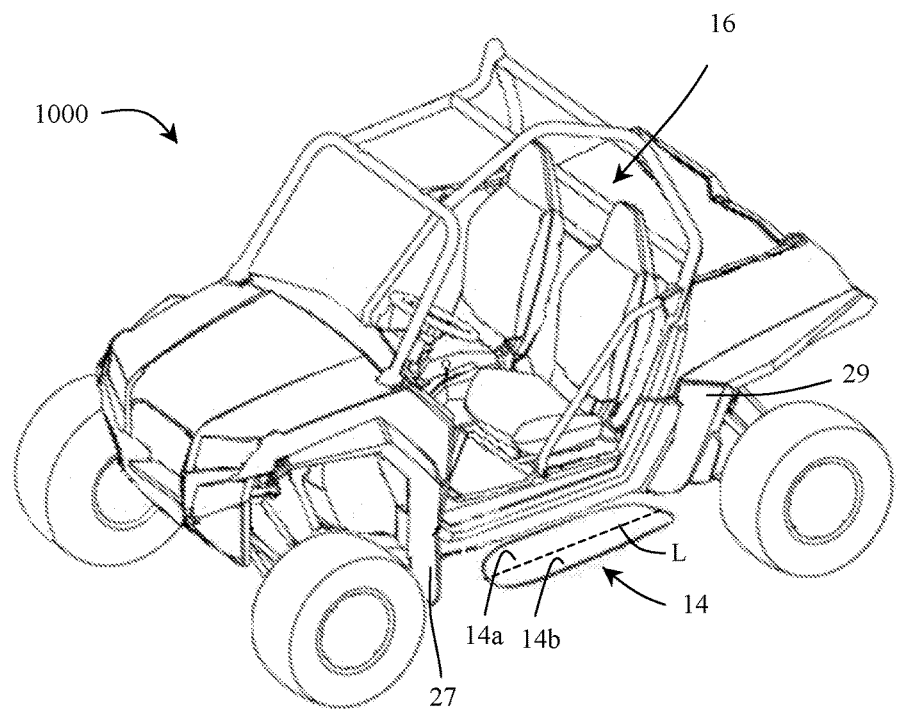
FIG. 6 schematically shows a perspective view of a vehicle including a dirt protection device according to the embodiments of the invention.

Attention is additionally drawn to FIGS. 2A and 2B showing a vehicle 100 possibly similar to vehicle 10 in FIG. 1 or any other similar type vehicle such as vehicle 1000 shown in FIG. 6. Vehicle 100 is preferably an outdoor or off-road vehicle such as an All-Terrain Vehicle (ATV), a side-by-side or Utility Task or Terrain Vehicle (UTV), or the like.

In an aspect of the present invention, vehicle 100 includes a dirt protection device 14 in accordance with an embodiment of the present invention. Dirt protection device 14, here in the form of a wing or spoiler, may be fitted or mounted to a lateral side of a vehicle in a vicinity of the vehicle's cockpit 16 where the driver and/or passenger seats. The device 14 extends below the cockpit and towards the front and back wheels of the respective side of the vehicle where the device is attached, placed and/or possibly integrally formed with the vehicle's body.

In a non-binding example, the material of a dirt protection device 14 according to various embodiments of the invention may be chosen to be from strong material (such as steel or the like) that can also serve as a side step for stepping into the vehicle. In another example, the material of the dirt protection device 14 may be chosen to be from soft material (such as a material comprising or consisting polymer material e.g. plastic or the like) that can be bendable or flexible in order to not e.g. limit maneuvering of the vehicle around any road or terrain.

With attention briefly drawn to FIG. 6, an embodiment of a dirt protection device 14 of the invention is shown being divided into lateral segments 14a, 14b; possibly of different type. Dashed line L extending parallel or along a longitudinal axis of device 14 divides device 14 into the two segments 14a, 14b that extend each possibly a full longitudinal extension of the device. In one example, the inner segment 14a adjacent the vehicle (here vehicle 1000) may be formed from a stiffer material, possibly metal or steel or the like, suitable for serving as a side step for entering the vehicle's cockpit 16, and the outer segment 14b, more distal from the vehicle, may be formed from a more softer and/or bendable and/or flexible and/or elastic material—possibly polymer material e.g. plastic or the like. In one example, outer segment 14b may be foldable about line L, preferably upwards. The folding about line L may be for any amount of degree, possibly also 180 degrees to place outer segment 14b to preferably lie upon or snuggly below inner segment 14a.

Device 14 in various embodiments of the invention may be mounted to a single lateral side of the vehicle, possibly a lateral side adjacent where the driver seats; or to both lateral sides of the vehicle and cockpit. Such vehicle lateral side to which a device 14 according to an embodiment(s) may be fitted or on which said device 14 may be integrally formed, may typically be defined as a lateral side of a vehicle's chassis or frame and/or bodywork added or attached to said vehicle's chassis or frame. In the figures only one dirt protection device 14 is shown at the close visible lateral side of the vehicle; however another second dirt protection device 14 may be located at the other hidden lateral side of the vehicle.

With attention drawn back to FIGS. 2A and 2B; dirt protection device 14 according to the embodiments of the present invention is seen including a front edge 13 most proximal to the front wheel, a rear edge 15 most proximal to the rear wheel, an inner lateral edge 17 most proximal to the vehicle's lateral side and an outer lateral edge 19 most distal from the vehicle's lateral side in a general lateral direction, where said lateral direction being defined as extending possibly horizontally away from a side of the vehicle.

Dirt protection device 14, as illustrated in FIG. 2B, may be configured to urge dirt, in particular dust, away from the vehicle's cockpit 16, for example when the vehicle in a moving in a forward direction. Dirt 12, possibly lifted by the vehicle's front wheel and/or front portion, may at least in part be urged by device 14 to extend in a generally horizontal and/or backward rear direction as vehicle 10 progresses forwardly—in order to substantially avoid cockpit 16 or limit/reduce entry of dirt, preferably dust, into the cockpit. In certain embodiments, the dirt 12 may be urged to extend or flow at least in part below device 14 in the horizontal or backward direction as the vehicle moves forward.

Figure 3B:
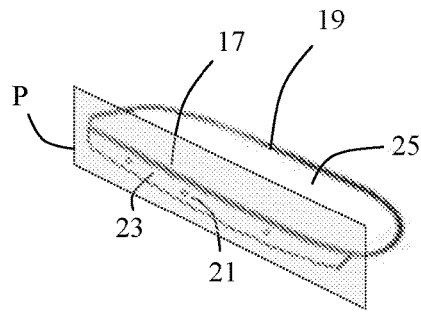
FIG. 3B schematically shows a perspective view of a dirt protection device according to an embodiment of the invention, from an angle revealing an inner lateral edge or side of the device.
Figure 3A:
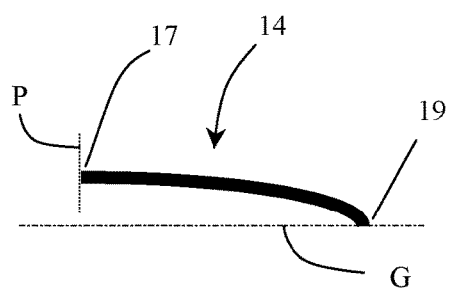
FIG. 3A schematically shows a cross section of an embodiment of a dirt protection device of the present invention, taken along a plane similar to plane III-III in FIG. 2A.

With attention drawn to FIG. 3A, a lateral cross section of an embodiment of device 14 is schematically seen, which is taken in a plane that is substantially perpendicular to a ground face and intersects the inner and outer lateral edges 17, 19. In the shown cross section, also a dashed line G representing an imaginary plane substantially parallel to a ground face is indicated.

With attention additionally drawn to FIG. 3B, an embodiment of a device 14, in particular when formed as a separate non-integral part of a vehicle, is seen including attachments means 21 located preferably along or adjacently along inner edge 17 for attaching device 14 to a vehicle. In the shown example, the attachment means 21 are shown formed on an optional attachment face 23 that extends away from inner edge 17 in a transverse or slanting direction relative to at least a portion of a main face 25 of device 14 adjacent edge 17, where said main face 25 being bound by the inner, outer, front and rear edges 17, 19, 13, 15. Such attachment means 21 may take various forms, such as dedicated hooks to connect to a side of a vehicle and/or existing screw holes in the device; and/or locations along edge 17 or face 23 for new holes/bores to be formed on site by a user; or the like.

In various embodiments of the present invention, the attachment means 21, may define an imaginary attachment plane P upon or about which device 14 may attach, connect and/or abut a lateral side of a vehicle. Possibly, plane P includes a part of device 14, such as face 23, which is adapted to at least partially attach and/or abut a lateral side of a vehicle. Such plane P may be generally perpendicular to a ground face above which device 14 is adapted to be placed when attached to a vehicle.

With attention drawn to FIG. 3A, device 14 in this embodiment is shown curved upwards forming, when viewed from an inner lower side when e.g. attached to a vehicle, a concave shape that opens downwards. Device 14 is also shown fitted to a vehicle, as here defined by attachment plane P, with its inner edge 17 and/or attachment face 23 and/or attachment means 21 running generally parallel to a ground face or a plane G parallel to the ground face. In this position and/or orientation, device 14 is shown placed with at least part of its outer lateral edge 19 lower than its inner edge 17 and more proximal to the ground face. Device 14 in this position and/or orientation may in some embodiments exhibit in substantially all lateral cross sections, an outer lateral edge 19 that is closer to the ground face in relation to inner edge 17, when attached to a vehicle; while in other embodiments only in a few lateral cross sections lateral side edge 19 may be lower.

Such lower lateral side 19 has been found in experiments to assist in urging dirt, preferably dust, away from the cockpit, possibly also in a lateral direction away from the vehicle.

Figure 4A:
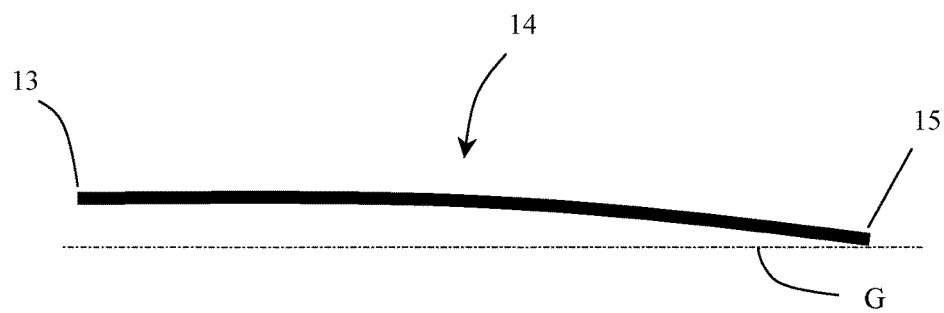
FIGS. 4A and 4B schematically show cross sections of various embodiments of dirt protection devices of the present invention, taken along a plane similar to plane IV-IV in FIG. 2A.

With attention drawn to FIG. 4A, a longitudinal cross section of an embodiment of device 14 is schematically seen, which is taken in a plane that is substantially perpendicular to a ground face and intersects the front and rear edges 13, 15. In the shown cross section, also a dashed line G representing an imaginary plane substantially parallel to a ground face is indicated.

Device 14 in this embodiment, in particular when formed as a separate part from the vehicle, may be fitted to a vehicle in a similar manner as defined above with respect to FIG. 3, i.e. by being attached to the vehicle upon or about plane P with inner edge 17 and/or attachment face 23 and/or attachment means 21 running generally parallel to the ground face. In such position and/or orientation, device 14 may be located with at least part of its rear edge 15 lower than its front edge 13 and more proximal to the ground face. Device 14 may in some embodiment's exhibit in substantially all such longitudinal cross sections a rear edge 15 that is closer to the ground face in relation to the front edge 13; while in other embodiments only in a few longitudinal cross sections such a rear edge 15 that is lower.

Such lower rear edge 15 has been found in experiments to assist in urging dirt, in particular dust, to extend horizontally or backwards, preferably below the device, during forward movement of vehicle 10—in order to avoid or limit entry of dirt into a vicinity of the cockpit.

Figure 4B:
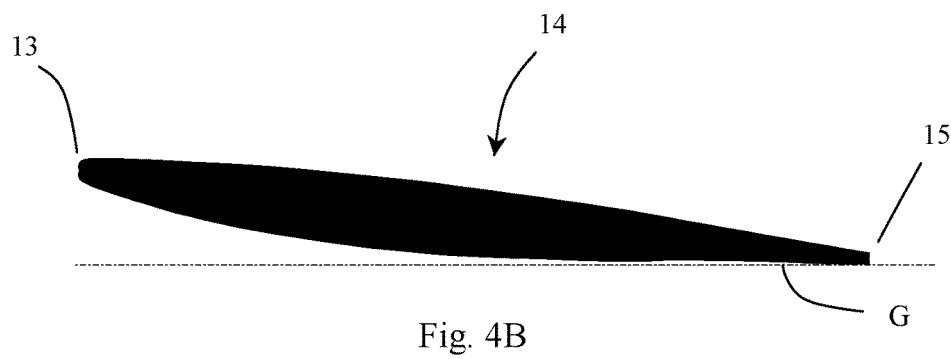

With attention drawn to FIG. 4B, a longitudinal cross section of an embodiment of device 14 is schematically shown with respect to again a dashed line G representing an imaginary plane substantially parallel to a ground face. In the shown embodiment, device 14 is seen having possibly an aerodynamic profile producing a downward aerodynamic force possibly sucking air downwards away from cockpit 16 to possibly flow horizontally below device 14—in order to avoid or limit dirt, in particular dust, from entering the cockpit.

Figure 5:
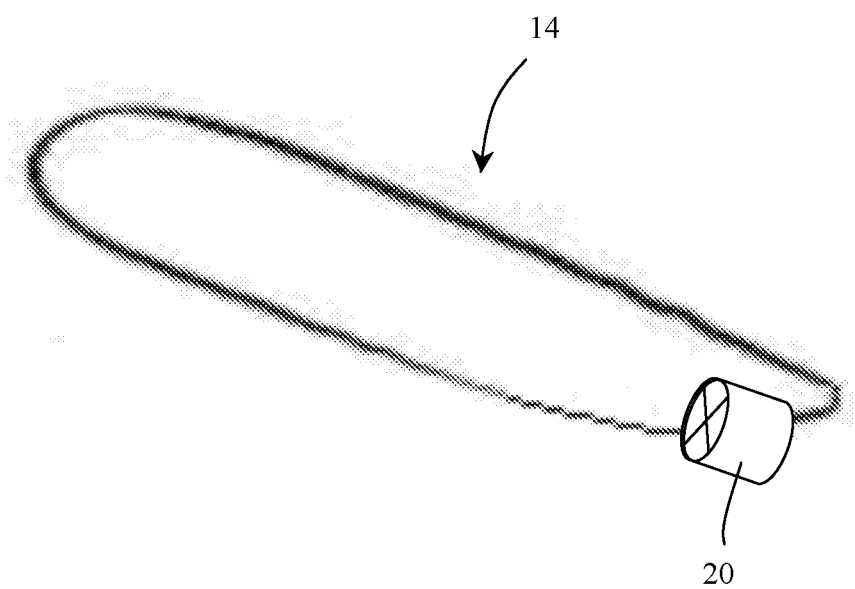
FIG. 5 schematically shows a perspective bottom view of an embodiment of a dirt protection device of the invention.

With attention drawn to FIG. 5 a further embodiment of a dirt protection device 14 according to the present invention is seen including one or more active means for producing air flow. Possibly such means may be in the form of one or more fans 20, located preferably at a lower rear side of the device 14. Such fan(s) 20 may assist in actively drawing dirt horizontally or backwards preferably below device 14 in order to avoid or limit presence of dirt in the vehicle's cockpit.

Attention is drawn to FIG. 6 showing a vehicle 1000, preferably an outdoor or off-road vehicle, such as an All-Terrain Vehicle (ATV), a side-by-side or Utility Task or Terrain Vehicle (UTV), or the like. In this example, vehicle 1000 is schematically illustrated as a side by side ATV generally similar to a Polaris RZR model. Vehicle 1000 is seen here including an embodiment of a device 14 generally similar and possibly including at least some or all of the various aspects/embodiments already described hereinabove.

Figure 7:
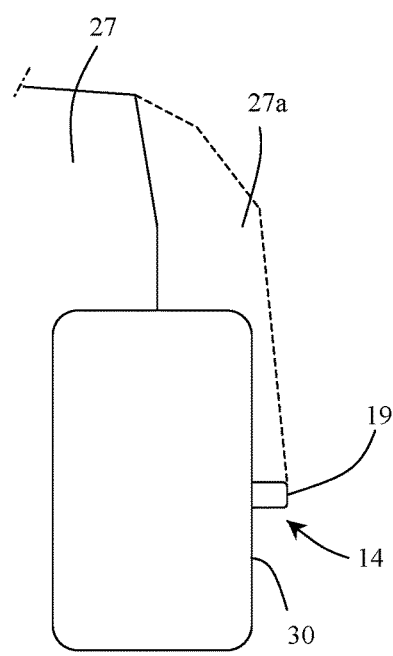
FIG. 7 is a front view of a portion of FIG. 6 taken adjacent a front wheel of the vehicle.

With attention additionally drawn to FIG. 7, schematically showing a partial front view of FIG. 6 adjacent one of its front wheels (when said wheel is directed/steered to point forwardly), further aspects of the present invention may be seen. In the shown example, an embodiment of a dirt protection device 14 is seen including a lateral extension away from the vehicle's lateral side that meets, or as here illustrated, preferably exceeds a lateral side 30 of a wheel, preferably a front wheel of the vehicle. Such extension of device 14 in a lateral direction away from the vehicle at least up to (or beyond) the lateral side 30 of the wheel, has been found to improve channeling by device 14 of dirt, preferably dust, away from the vehicle's cockpit 16 during forward movement of the vehicle.

Device 14 in the various embodiments of the invention may be formed to extend, merge and/or attach to the front and/or rear fenders 27, 29 of the vehicle that respectively frame the front and rear wheels on each side of the vehicle. In FIG. 7, an example is seen where a front fender 27 of a vehicle is shown having a lateral extension that is less than the lateral side 30 of the vehicle's front wheel (at least when said wheel points forwardly) and less than the lateral extension of device 14 up to edge 19. Possibly, an embodiment of device 14 when attached to a vehicle including such a relation between fender, preferably front fender 27, and wheel and/or embodiment of protection device 14; may be provided with a fender extension, here front fender extension 27a. In embodiments where device 14 merges and/or attaches to a fender, device 14 may extend forwardly also to the extension 27a of the fender.

Figure 8:
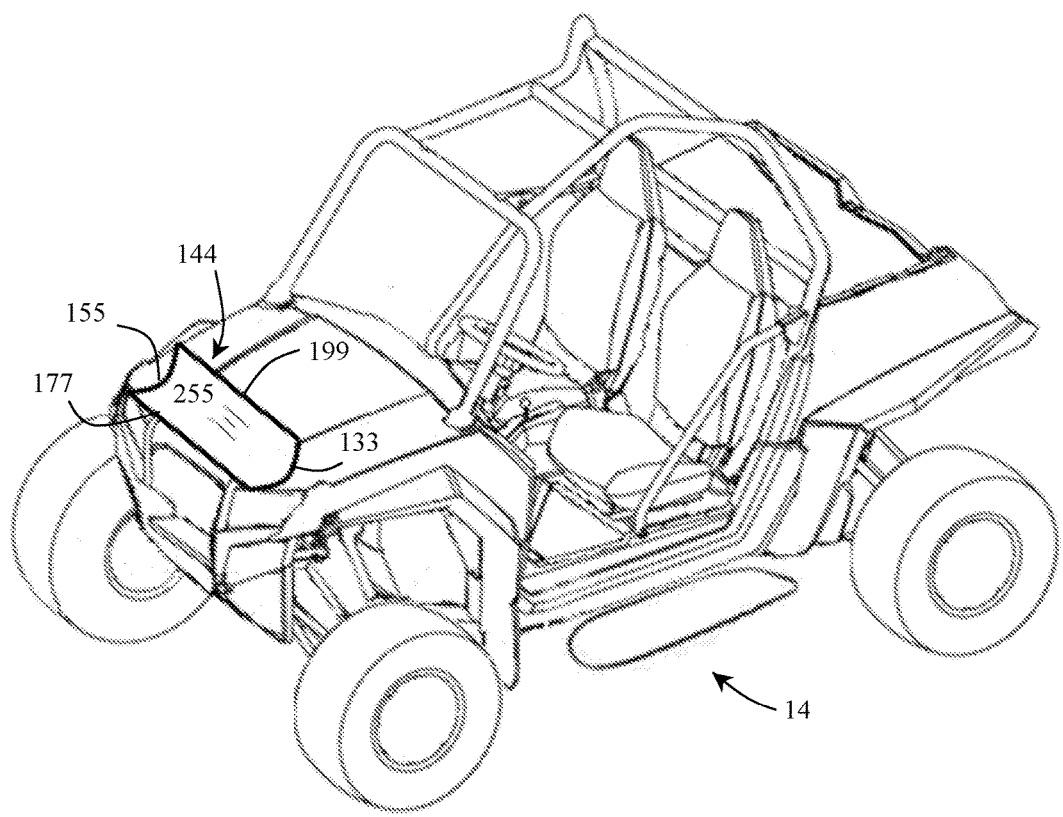
FIG. 8 schematically shows a perspective view of a vehicle including a dirt protection device according to the embodiments of the invention together with an embodiment of an additional type variation of dirt protection device.

With attention drawn to FIG. 8 a vehicle such as that seen in FIG. 7 is schematically shown including an embodiment of a dirt protection device 144 placed on a front bonnet or on the front frame of the vehicle to channel away dirt, possibly, from other vehicles driving in front of the vehicle. Device 144 may be provided alone and/or with an embodiment of a device 14 (one of those described above) to a vehicle. In an embodiment, device 144 may be substantially identical in geometry to a device 14 according at least some embodiments of the invention, that may be placed together therewith on the vehicle. That is to say that device 144 may be bound in its longitudinal direction between two generally laterally extending edges 133, 155 and in its lateral direction between two generally longitudinally extending edges 177, 199, with the device's lateral extension being shorter than its longitudinal extension. Device 144 in addition may be curved by e.g. providing the two edges 133, 155 in a curved formation, and device 144 may be placed on the vehicle's bonnet with its longitudinal edges 177, 199 extending in a lateral direction of the vehicle with a face 255 of device 144 bound between edges 133, 155, 177, 199 being curved upwards so as to form a concave shape opening upwards.

In aspects of the invention, combinations of features shown in various embodiments of the present disclosure may be combined in order to produce enhanced performance in certain driving environments. For example, in addition to at least part of outer edge 19, as discussed with respect to FIG. 3A, being lower than inner edge 17; at least part of rear edge 15, as discussed with respect to FIG. 4A, may be lower than front edge 13. In another example; outer lateral edge 19 shown in its lower relative position in FIG. 3A may be combined with the lower rear edge 15 and/or upwards curving profile seen in FIG. 3A and/or the aerodynamic profile seen in FIG. 4B.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Although the present embodiments have been described to a certain degree of particularity, it should be understood that various alterations and modifications could be made without departing from the scope of the invention as hereinafter claimed.

What is claimed is:

1. A vehicle comprising a dirt protection device, the device having a longitudinal extension extending between forward and rear edges and a shorter lateral extension extending between inner and outer edges, the device extending with at least a portion of the inner edge adjacently along a lateral side of the vehicle below a cockpit of the vehicle, wherein the forward edge being most proximal to the vehicle's front wheel and the rear edge being most proximal to the vehicle's rear wheel, wherein the device is detachable from the vehicle and in a longitudinal cross section taken in a plane perpendicular to a ground face and intersecting the forward and rear edges, the device comprises an aerodynamic profile producing a downward aerodynamic force during forward movement of the vehicle.

2. The vehicle of claim 1, wherein the device extends laterally away from the lateral side of the vehicle.

3. The vehicle of claim 2, wherein the device is attached or fitted to the lateral side of the vehicle along at least a portion of its inner edge or a face extending along the inner edge and wherein at least a portion of the rear edge is more proximal to a ground face than the forward edge.

4. The vehicle of claim 3, wherein at least a portion of the outer edge is more proximal to a ground face than the inner edge.

5. The vehicle of claim 1, wherein the device is not an integral part of the vehicle.

6. The vehicle of claim 1, wherein at least a portion of the device is foldable relative to the vehicle.

7. The vehicle of claim 1, wherein the device comprises two inner and outer lateral segments extending each along the full longitudinal extent of the device, and the outer segment if foldable relative to the inner segment.

8. The vehicle of claim 1, wherein the device is adapted to urge at least part of the dirt, preferably dust, lifted during forward movement of the vehicle to extend substantially horizontally and/or rearward rather than upwards.

9. The vehicle of claim 1 and comprising a fender for framing a front wheel of the vehicle at a side of the vehicle comprising the dirt protection device, and in a front view of the vehicle the device having a lateral extension up to at least part of the outer edge that exceeds a lateral extension of the fender.

10. A method of protecting a cockpit of a vehicle against dirt, preferably dust, the method comprising the steps of:

providing a detachable dirt protection device having a longitudinal extension that is larger than its lateral extension, placing the device with its longitudinal extension along a lateral side of a vehicle to extend below a cockpit of the vehicle, wherein at least part of dirt, preferably dust, lifted by the vehicle during forward movement of the vehicle is urged by the device to extend in a substantial horizontal and/or rear direction rather than upwards.

11. The method of claim 10, wherein the device extends longitudinally between forward and rear edges and laterally between inner and outer edges, and wherein the device is placed along the lateral side of the vehicle with at least a portion of its inner edge extending adjacently along the vehicle's lateral side, and wherein the forward edge being most proximal to the vehicle's front wheel and the rear edge being most proximal to the vehicle's rear wheel.

12. The method of claim 11, wherein the outer edge is more laterally distal of the vehicle than the inner edge and wherein at least a portion of the outer edge is more proximal to a ground face than the inner edge.

13. The method of claim 12, wherein at least a portion of the rear edge is more proximal to a ground face than the forward edge.

14. The method of claim 11, wherein in a longitudinal cross section taken in a plane perpendicular to a ground face and intersecting the forward and rear edges, the device comprises an aerodynamic profile producing a downward aerodynamic force during forward movement of the vehicle.

15. The method of claim 10, wherein the device is not an integral part of the vehicle and is detachable from the vehicle.

16. The method of claim 10, wherein at least part of the device is foldable relative to the vehicle.

17. A dirt protection device for a vehicle, the device having a longitudinal extension extending between forward and rear edges and a shorter lateral extension extending between inner and outer edges, the device in addition comprising attachment means for attaching to a part of a vehicle, where said attachment means being along or alongside at least a portion of the inner edge, said attachment means defining an imaginary attachment plane configured to be generally parallel to at least a portion of the vehicle's part when connected thereto, and wherein when the device is placed with the inner edge parallel to a ground face and the attachment plane perpendicular to the ground face at least a portion of the outer edge is lower than the inner edge, and wherein when the device is placed with the inner edge parallel to a ground face and the attachment plane perpendicular to the ground face at least a portion of the rear edge is lower than the forward edge.

18. The method of claim 10 and comprising a fan attached to the dirt protection device for assisting in actively drawing dirt horizontally or backwards preferably below device.

* * * * *